Nov. 9, 1943.                    C. W. CLARK                    2,333,640
                                WORK HOLDER
                           Filed Oct. 16, 1942            2 Sheets-Sheet 1

Clyde Walter Clark  INVENTOR
BY
Daniel G. Cullen  ATTORNEY

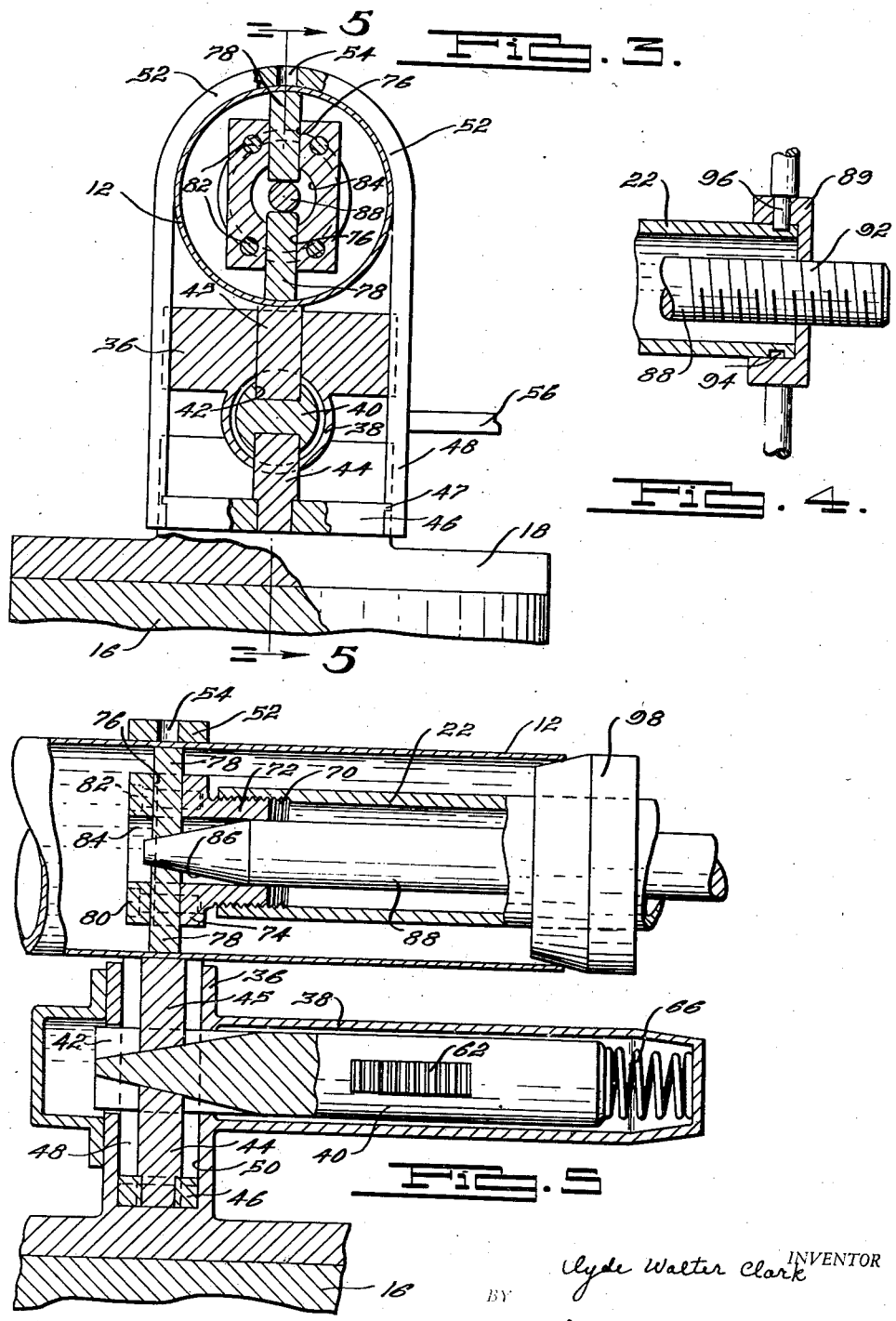

Patented Nov. 9, 1943

2,333,640

UNITED STATES PATENT OFFICE 2,333,640

WORK HOLDER

Clyde Walter Clark, Dearborn, Mich.

Application October 16, 1942, Serial No. 462,279

6 Claims. (Cl. 265—12)

This application relates to work supports.

When I contemplated using the hardness tester of my application, Serial No. 384,083, filed March 19, 1941, for testing the hardness of a work piece in the form of a thin sheet metal tube, I recognized the necessity of bracing the work piece against distortion due to the impact of the testing point thereon, and of transferring the impact through the work piece to the base of the machine, and therefore I have devised the work support herein disclosed, which not only supports the work piece but also braces it against that impact, transferring impact from the testing point to the base of the machine.

For an understanding of that work support, reference is made to the appended drawings. In these drawings, Figs. 1 and 2 are side and headon views of a hardness tester with the work support therein.

Figs. 3 and 4 are enlarged details.

Fig. 5 is a section on line 5—5 of Fig. 3.

Figure 1:
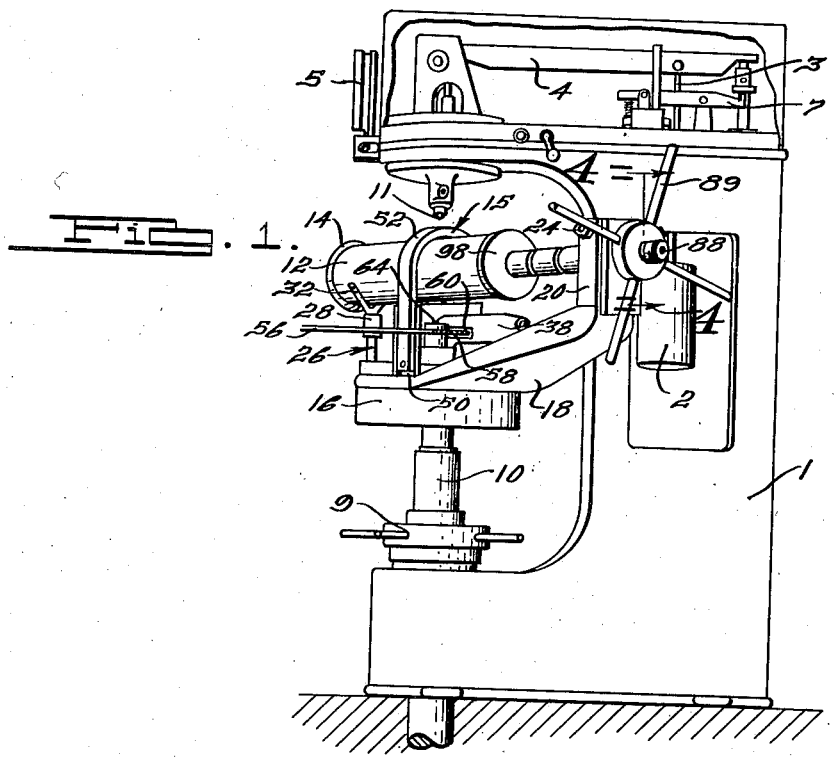
Figure 2:
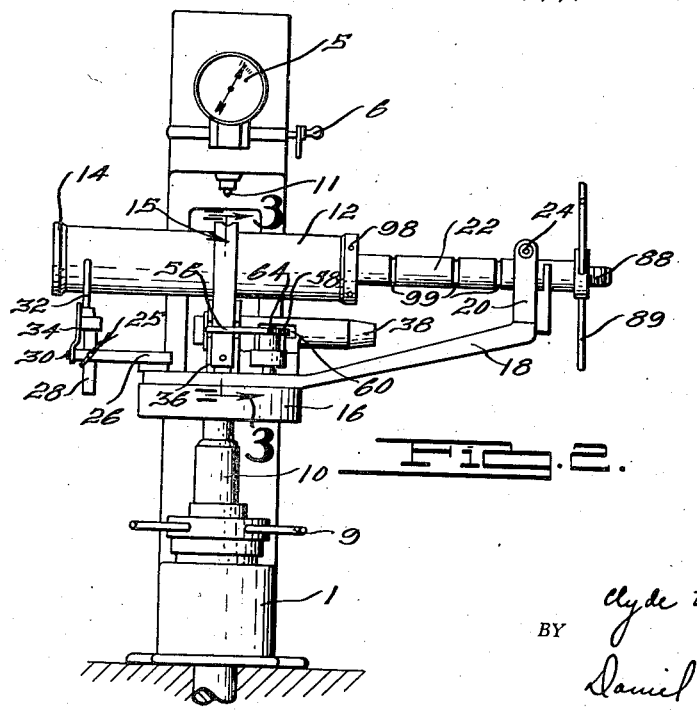

The drawings disclose a penetrator type testing machine whose C shaped frame 1 has a load 2 connected by a link 3 to a load beam 4 whose deflection is measured by an indicator 5. A handle 6 operates on the beam 4 through a linkage 7 to lift it and then to release it to drop under load.

Operated by a hand wheel 9 is a work support or elevating screw 10 which supports the work whose upper surface is to be penetrated by the penetrating point 11 connected to and moved down for testing by the load beam 4 under loaded impact. The work piece 12, disposed between the screw 10 and the point 11, is in the form of a hollow tube having one end open and the other end closed and flanged, as shown at 14. The work piece is supported by a fixture 15, which is the novel element hereof, resting on a table 16 on the upper end of screw 10.

The fixture 15 is intended to support the work piece 12 in a horizontal position between the upper end of screw 10 and the lower end of the point 11 and to permit the work piece to be moved horizontally so that different portions thereof may be penetrated by the point 11 while supported on the upper end of the screw 10. The fixture is also intended to brace the work piece against the impact of point 11 thereon.

The fixture rests on a table 16, threaded on to the upper end of the screw 10 so as to be secured thereto. It comprises a bracket 18 resting on and secured to the table 16 by screws (not shown) and having an upwardly extending portion 20 split to form a yoke in which is slidably disposed a hollow tube 22, later to be described in detail, with a suitable screw 24 clamping the tube 22 in any desired location with respect to the bracket 18.

Also secured to the bracket 18 in any suitable manner is a steady rest 25 including an arm 26 in which is mounted a post 28, the latter being adjustable vertically and clamped in place by a screw 30. The post pivotally supports a V rest 32 with the pivot so formed that the V rest 32 may swing towards the bracket 18 from its vertical position but may not swing in the opposite direction. A leaf spring 34 secured to the arm 26 tends to hold the V rest 32 in its vertical position when the V rest is already in that position. The steady rest 25 holds the work piece 12 steady, as can clearly be seen, and may be collapsed so as to free that work piece when it is moved horizontally so that its flange 14 approaches the bracket 18, the flange serving to kick over the V rest 32 and thus collapse the steady rest.

Formed integrally with the bracket 18 is a body portion 36 which immovably mounts a barrel 38. Slidably mounted within this barrel is a horizontally movable spreading means in the form of a wedging pin or rod 40 having tapered slots 42 for causing spreading movement of external brace means in the form of pins 44, 45 in opposite directions away from the center line or axis of the rod 40. The lower pin 44 seats in a crossbar 46 whose ends are fastened by dovetails 47 to the lower ends of a U shaped stirrup 48, slidably mounted in guide slots 50 of the body 36, so as to move vertically. The bight 52 of the stirrup surrounds the work piece 12, and has a hole 54 for the testing point 11. The work piece 12 may therefore be positioned between the upper pin 45 and the bight 52 to be held in place without distortion of the work piece, with the holding action provided by the opposite movements of the pins 44, 45 as motivated by the horizontal movement of the wedge rod 40.

Such horizontal movement of the wedge rod 40 is provided by means of a quadrant or lever 56 whose toothed portion 58 extends through a horizontal slot 60 of the barrel 38 so as to mesh with rack teeth 62 formed on the wedge rod 40, the lever 56 being mounted on a vertical pivot pin 64 of the body 36. A suitable backing spring 66 within the barrel abuts the rack tooth end of the wedge rod 40, tending to move the rod 40 in such a direction that it spreads the pins 44, 45, such movement of the rod 40 however, being under the control of the quadrant or lever 56.

As has previously been stated, the vertical portion 20 of the bracket 18 supports a horizontal tube 22 in a clamped position, with clamping provided by the screw 24. The free end of this tube 22 is intended to be positioned within the work piece 12. The tube 22 has a free end portion of its interior threaded, as at 70, for adjustably receiving the threaded hollow sleeve portion 72 of a slide plate 74 having vertical slots 76 receiving vertically moving internal brace means in the form of plungers 78 held in place in the slot 76 by a cap plate 80 fastened to the slide plate 74 by suitable screws 82. The plates 74 and 80 have alined center holes 84 communicating with the slots 76 and into which may project the plungers 78, whereby the latter may be spread or caused to move oppositely away from the center line of tube 22 by the wedge end 86 of a spreading means or wedge rod 88 disposed within the hollow tube 22 and passing through the alined center holes 84 of the threaded portion 72 and the body of the slide plate 74 and the cap plate 80.

A hand wheel or nut 89, keyed against longitudinal movement with respect to tube 22 is threaded onto a threaded portion 92 of the wedge rod, the latter having a slot or keyway 94 receiving a key 96 of the tube 22, so as to be non-rotatable therein. The hand wheel therefore functions as a nut, having no horizontal movement of its own, but instead when rotated, it causes horizontal movement of the wedge rod with respect to the tube 22 against which the hand wheel reacts. This is a conventional construction in devices of this character, a similar hand wheel being used on testing machines for adjusting the position of the elevating screw 10.

Adjustment of the longitudinal position of the wedge rod 88 by the hand wheel 89 with respect to the tube 22 controls transverse or vertical sliding of the plungers 78 with respect to the work piece 12.

The threads 70—72 and the yoke 20 permit adjustment of the plungers 78 so that they may aline with the upper pin 45 and the stirrup hole 54 and thus be directly in line with penetrating point 11, whereby when the penetrating point 11 is dropped under load, there will be no possibility of collapsing the work piece 12 under that impact. At the same time, however, once the fixture has been adjusted to a particular job, that is to say once the plungers 78 and the stirrup 52 with its pins 44, 45 and its hole 54 have been alined, there is required nothing more than manipulation of the quadrant or lever 56 and the hand wheel 89 connected to the wedge rod 88 for causing the stirrup 52, the pins 44, 45 and the plungers 78 to move vertically to and from the work piece 12 either to engage that tube for bracing it or to free that tube to permit it to be moved horizontally for presenting various portions thereof to the penetrating point 11, such operations being formed easily and quickly merely by the manipulation of the quadrant lever 56 and the hand wheel 89.

For steadying the work piece 12 at the end thereof opposite the flange 14 there is slidably mounted on the tube 22 a cone or collar 98. A suitable ball check and spring arrangement, not shown, within collar 98 cooperates with grooves 99 of the tube 22 to hold the collar 98 against free movement with respect to the tube. When the collar 98 is fitted into the end of the work piece 12 it steadies that end.

The use of the device is as follows. In setting up the machine for a job, the fixture, including the bracket 18 and the body 36, are first secured to the table 16 in turn secured to the elevating screw 10 of the testing machine. A work piece 12 to be tested is then thrust through the stirrup 52 and around the plates 74—80 on the end of tube 22, with one end of the work piece 12 supported on the steady rest 25. With the plungers 78 and pins 44—45 and hole 54 alined properly, and with collar 98 properly positioned in a groove 99 of the tube 22, and with wedge rods 40 and 88 backed off to move pins 44—45 and stirrup 52 and plungers 78 to their free positions, the work piece 12 to be tested can be moved along as desired to present various portions thereof to the hole 54 of the stirrup and to the penetrating point 11. When a test is to be made at a particular portion of the tube, the quadrant lever 56 and the hand wheel 89 may be manipulated, whereupon the work piece 12 will be reinforced and braced against the impact of the penetrating point 11 and then the test is made. The work piece 12 is thereafter freed by reverse movement of the quadrant lever 56 and the hand wheel 89 and the work piece 12 may be moved again horizontally with respect to the penetrating point 11.

If the movement of the work piece 12 is great enough its flange 14 will kick over the steady rest 25 and render it inoperative.

The tapers on the wedges 42—86 are so flat that there is practically no horizontal component to the load of point 11; thus all the load is taken by the lower pin 44 bearing on cross bar 46 of U strap 48 which rests on the body or casting 36—18 in turn resting on table 16. All the load from spindle point 11 is on the center line of spindle point 11, because that point 11 is aligned with plungers 78, and pins 44—45.

Now having described the work support hereof, reference should be had to the claims which follow:

I claim:

1. For use in a machine having a work support and a load means adapted to apply with downward impact a load to the work, a fixture for holding a work piece in the form of a tube on the upper end of the work support below the load means, and for bracing the work piece against the impact of the load means comprising a bracket adapted to be secured to the work support, a tube on the bracket extending into the work piece, internal brace means thereon movable transversely of the tube and work piece, when spread, to engage the work piece internally at diametrically opposed points and brace it, spreading means movably mounted within the tube and positioned between the internal brace means and movable axially of the tube and work piece for spreading the internal brace means, manual means for moving the last mentioned spreading means axially of the work piece and tube, the last named spreader means and the bracket forming a thrust receiving abutment and seat for that one of the internal brace means which engages the upper part of the work piece internally from below and thus supports it and receives the impact of the load means.

2. For use in a machine having a work support and a load means adapted to apply with downward impact a load to the work, a fixture for holding a work piece in the form of a tube on the upper end of the work support below the load means, and for bracing the work piece against the impact of the load means comprising a bracket adapted to be secured to the work support, a stirrup movably guided on the bracket for partially surrounding the work piece, external brace means within the stirrup movable, when spread, to move the stirrup down to the work piece and to move up against the work piece for bracing it, the external brace means and stirrup bracing the work piece externally and at diametrically opposite points, the stirrup having a hole at one of said points through which the load means may pass to engage the work piece externally, the load means impact being thus at an upper point diametrically opposite the lower point of external bracing of the work piece, spreading means movably mounted on the bracket and positioned between the external brace means and movable axially of the work piece for spreading the external brace means, manual means for moving the spreading means axially of the work piece, with the spreader means and the bracket forming a thrust receiving abutment and seat for that one of the external brace means which engages the lower part of the work piece externally from below and thus supports it and receives the impact of the load means.

3. For use in a machine having a work support and a load means adapted to apply with downward impact a load to the work, a fixture for holding a work piece in the form of a tube on the upper end of the work support below the load means, and for bracing the work piece against the impact of the load means comprising a bracket adapted to be secured to the work support, a tube on the bracket extending into the work piece, internal brace means thereon movable transversely of the tube and work piece, when spread, to engage the work piece internally at diametrically opposed points and brace it, spreading means movably mounted within the tube and positioned between the internal brace means and movable axially of the tube and work piece for spreading the internal brace means, manual means for moving the last mentioned spreading means axially of the work piece and tube, the last named spreader means and the bracket forming a thrust receiving abutment and seat for that one of the internal brace means which engages the upper part of the work piece internally from below and thus supports it and receives the impact of the load means, a stirrup movably guided on the bracket for partially surrounding the work piece, external brace means within the stirrup movable, when spread, to move the stirrup down to the work piece and to move up against the work piece for bracing it, the external brace means and stirrup bracing the work piece externally and at diametrically opposite points, the stirrup having a hole at one of said points through which the load means may pass to engage the work piece externally, the load means impact being thus at an upper point diametrically opposite the lower point of external bracing of the work piece, spreading means movably mounted on the bracket and positioned between the external brace means and movable axially of the work piece for spreading the external brace means, manual means for moving the spreading means axially of the work piece, with the spreader means and the bracket forming a thrust receiving abutment and seat for that one of the external brace means which engages the lower part of the work piece externally from below and thus supports it and receives the impact of the load means.

4. For use in a machine having a work support and a load means adapted to apply with downward impact a load to the work, a fixture for holding a work piece in the form of a tube on the upper end of the work support below the load means, and for bracing the work piece against the impact of the load means comprising a bracket adapted to be secured to the work support, a tube on the bracket extending into the work piece, internal brace means thereon movable transversely of the tube and work piece, when spread, to engage the work piece internally at diametrically opposed points and brace it, spreading means movably mounted within the tube and positioned between the internal brace means and movable axially of the tube and work piece for spreading the internal brace means, manual means for moving the last mentioned spreading means axially of the work piece and tube, the last named spreader means and the bracket forming a thrust receiving abutment and seat for that one of the internal brace means which engages the upper part of the work piece internally from below and thus supports it and receives the impact of the load means, a stirrup movably guided on the bracket for partially surrounding the work piece, external brace means within the stirrup movable, when spread, to move the stirrup down to the work piece and to move up against the work piece for bracing it, the external brace means and stirrup bracing the work piece externally and at diametrically opposite points, the stirrup having a hole at one of said points through which the load means may pass to engage the work piece externally, the load means impact being thus at an upper point diametrically opposite the lower point of external bracing of the work piece, spreading means movably mounted on the bracket and positioned between the external brace means and movable axially of the work piece for spreading the external brace means, manual means for moving the spreading means axially of the work piece, with the spreader means and the bracket forming a thrust receiving abutment and seat for that one of the external brace means which engages the lower part of the work piece externally from below and thus supports it and receives the impact of the load means, the internal brace means being longitudinally adjustably positioned so as to be movable into transverse alinement with the lower external brace means and the stirrup hole.

5. In combination, a work support, a load device above it, a hollow tube between them arranged horizontally, plungers within the tube engaging it internally and alined with the load device and each other, pins below the tube engaging it from below and engaging the work support and alined with the plungers and each other and the work support, whereby the load device, the plungers, the pins, and the work support are all alined.

6. In combination, a work support, a load device above it, a hollow tube between them arranged horizontally, plungers within the tube engaging it internally and alined with the load device and each other, pins below the tube engaging it from below and engaging the work support and alined with the plungers and each other and the work support, whereby the load device, the plungers, the pins, and the work support are all alined, and means for separating the plungers and pins so that they firmly engage the tube and the work support, while alined.

CLYDE WALTER CLARK.